United States Patent
Mistry et al.

(10) Patent No.: US 10,445,339 B1
(45) Date of Patent: Oct. 15, 2019

(54) DISTRIBUTED CONTEXTUAL ANALYTICS

(71) Applicant: EMC Corporation, Hopkinton, MA (US)

(72) Inventors: Nalinkumar Mistry, Ottawa (CA); Stephen Todd, Shrewsbury, MA (US); Mats Wahlstrom, Lakewood Ranch, FL (US); David Frattura, New York, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 599 days.

(21) Appl. No.: 14/584,655

(22) Filed: Dec. 29, 2014

Related U.S. Application Data

(60) Provisional application No. 62/003,733, filed on May 28, 2014.

(51) Int. Cl.
  *G06F 17/30* (2006.01)
  *G06F 16/27* (2019.01)
  *H04L 12/917* (2013.01)
  *H04L 12/26* (2006.01)

(52) U.S. Cl.
  CPC .............. *G06F 16/27* (2019.01); *H04L 43/08* (2013.01); *H04L 47/76* (2013.01)

(58) Field of Classification Search
  None
  See application file for complete search history.

(56) References Cited

U.S. PATENT DOCUMENTS

| | | |
|---|---|---|
| 6,459,682 B1 | 10/2002 | Ellesson et al. |
| 6,556,659 B1 | 4/2003 | Bowman-Amuah |
| 7,054,943 B1 | 5/2006 | Goldszmidt et al. |
| 7,269,157 B2 | 9/2007 | Klinker et al. |
| 7,356,602 B2 | 4/2008 | Goldszmidt et al. |
| 7,653,730 B1 | 1/2010 | Hoffman et al. |
| 7,937,453 B1 | 5/2011 | Hayden et al. |
| 8,190,850 B1 | 5/2012 | Davenport et al. |
| 8,291,411 B2 | 10/2012 | Beaty et al. |
| 8,452,928 B1 | 5/2013 | Ofer et al. |
| 2002/0083118 A1 | 6/2002 | Sim |
| 2002/0133491 A1 | 9/2002 | Sim et al. |

(Continued)

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.

(Continued)

*Primary Examiner* — Khanh B Pham
(74) *Attorney, Agent, or Firm* — Ryan, Mason & Lewis, LLP

(57) ABSTRACT

Distributed nodes are implemented using virtualization infrastructure of at least one processing platform. The processing platform is implemented using at least one processing device comprising a processor coupled to a memory. The distributed nodes collectively provide at least a portion of a distributed contextual analytics framework comprising analytics functions deployed at respective ones of the nodes. For example, the distributed nodes illustratively comprise multiple local nodes and at least one central node, with the distributed contextual analytics framework comprising local analytics functions deployed at respective ones of the local nodes and a central analytics function deployed at the central node.

20 Claims, 8 Drawing Sheets

(56) References Cited

U.S. PATENT DOCUMENTS

| | | | |
|---|---|---|---|
| 2003/0117954 A1 | 6/2003 | De Neve et al. | |
| 2003/0204586 A1* | 10/2003 | Schnetzler | H04L 29/06 709/224 |
| 2011/0035781 A1 | 2/2011 | Moghe | |
| 2011/0264663 A1 | 10/2011 | Verkasalo | |
| 2012/0023066 A1* | 1/2012 | Bourbonnais | G06F 17/30566 707/613 |
| 2012/0076052 A1 | 3/2012 | Kling et al. | |
| 2014/0101665 A1 | 4/2014 | Mousseau et al. | |
| 2014/0201374 A1* | 7/2014 | Ashwood-Smith | H04L 49/70 709/226 |
| 2014/0241247 A1 | 8/2014 | Kempf et al. | |
| 2014/0244701 A1 | 8/2014 | Welton et al. | |
| 2014/0280338 A1* | 9/2014 | Metz | H04L 41/0853 707/774 |
| 2014/0298337 A1 | 10/2014 | Anderson et al. | |
| 2014/0301192 A1 | 10/2014 | Lee et al. | |
| 2014/0317261 A1 | 10/2014 | Shatzkamer et al. | |
| 2015/0253960 A1* | 9/2015 | Lin | G06F 3/0481 715/733 |
| 2015/0326448 A1* | 11/2015 | Chaudhary | G06Q 20/14 705/40 |

OTHER PUBLICATIONS

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

A. Keller et al., "The WSLA Framework: Specifying and Monitoring Service Level Agreements for Web Services," Journal of Network and Systems Management, Mar. 2003, pp. 57-81, vol. 11, No. 1.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

M.K. Nichat et al., "Review on Modeling and Implementation of Cloud Computing," International Journal of Computer Science and Information Technologies (IJCSIT), Jan.-Feb. 2014, pp. 508-511, vol. 5, No. 1.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain "OpenFlow, Software Defined Networking (SDN) and Network Function Virtualization (NFV)," Washington University in St. Louis, http://www.cse.wustl.edu/~jain/tutorials/icc14.htm, 2014, 93 pages.

* cited by examiner

DISTRIBUTED CONTEXTUAL ANALYTICS

PRIORITY CLAIM

The present application claims the priority of U.S. Provisional Patent Application Ser. No. 62/003,733, filed May 28, 2014 and entitled "Distributed Contextual Analytics," which is incorporated by reference herein.

FIELD

The field relates generally to information processing systems, and more particularly to techniques for implementing analytics functionality in information processing systems comprising virtualization infrastructure.

BACKGROUND

Information processing systems increasingly utilize reconfigurable virtual resources to meet changing end user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein. However, despite these and other recent advances in virtualization techniques, a need remains for further improvements, for example, with regard to implementation of analytics functionality.

SUMMARY

Illustrative embodiments of the present invention provide distributed contextual analytics functionality in network-based information processing systems comprising virtualization infrastructure.

In one embodiment, distributed nodes are implemented using virtualization infrastructure of at least one processing platform. The processing platform is implemented using at least one processing device comprising a processor coupled to a memory. The distributed nodes collectively provide at least a portion of a distributed contextual analytics framework comprising analytics functions deployed at respective ones of the nodes.

For example, the distributed nodes illustratively comprise multiple local nodes and at least one central node, with the distributed contextual analytics framework comprising local analytics functions deployed at respective ones of the local nodes and a central analytics function deployed at the central node.

The distributed nodes may be dynamically added to, modified in and deleted from the distributed contextual analytics framework in accordance with one or more specified policy criteria.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
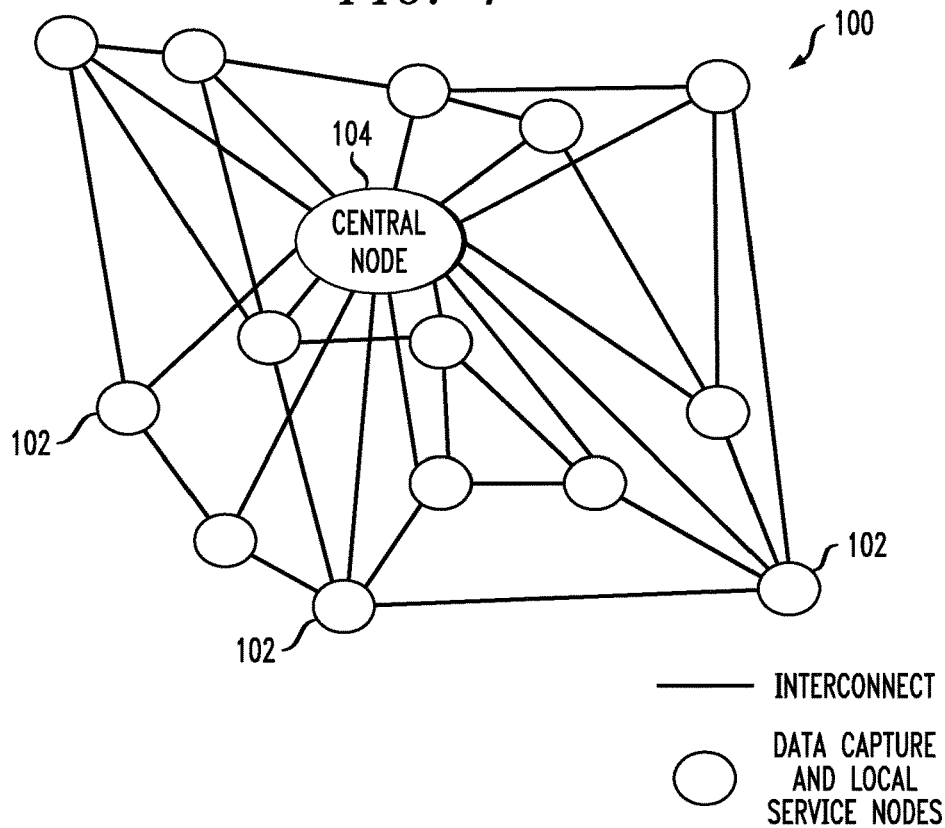
FIG. 1 is a block diagram of an information processing system with distributed contextual analytics functionality in an illustrative embodiment.

FIG. 1 shows an information processing system 100 comprising a plurality of distributed nodes, illustratively including multiple local nodes 102 and a central node 104, implemented at least in part utilizing resources of virtualization infrastructure of the system 100. By way of example, these virtualization infrastructure resources used to implement nodes 102 and 104 comprise compute, network and storage resources associated with one or more operator networks or other service provider networks.

The nodes 102 and 104 are configured to communicate with one another via interconnects arranged as shown. The local nodes 102 are also designated in the figure as data capture and local service nodes of the system 100, although numerous other types and configurations of local nodes can be used in other embodiments.

In addition, although the system 100 comprises only a single central node 104, other embodiments can include multiple central nodes. The local nodes can be deployed over a geographically disparate area.

The distributed nodes 102 and 104 are illustratively part of one or more networks, such as operator networks or other service provider networks. By way of example, at least a subset of the local nodes 102 comprise respective edge nodes of one or more networks and the central node 104 comprises a core node of the one or more networks. At least a subset of the distributed nodes 102 and 104 can be dynamically added to and deleted from the one or more networks in accordance with one or more policies.

The nodes 102 and 104 collectively provide at least a portion of a distributed contextual analytics framework comprising analytics functions deployed at respective ones of the nodes. For example, the distributed contextual analytics framework may comprise local analytics functions deployed at respective ones of the local nodes 102 and a central analytics function deployed at the central node 104.

The distributed contextual analytics framework in the present embodiment further comprises multiple additional functions, illustratively including data capture functions and service functions deployed at respective ones of at least a subset of the local and central nodes 102 and 104. Some of the local nodes are therefore configured to both capture data, such as a local video feed or other type of data, and to provide local services to customers or other end users within local service areas of those nodes.

The term "end user" as used herein is intended to be broadly construed so as to encompass not only customers or other human users, but also numerous other arrangements of human, hardware, software or firmware entities, as well as combinations of such entities.

A given one of the local nodes 102 may comprise a local analytics function that performs local analytics on data captured by a local data capture function of the given local node 102. Results of the local analytics are sent to the central node 104 for further processing by the central analytics function.

The distributed contextual analytics framework in the present embodiment further comprises data replication functions deployed at respective ones of at least a subset of the local and central nodes 102 and 104.

A given one of the local nodes 102 may further comprise a local data replication function that replicates at least a portion of data captured by a local data capture function of the given local node. The replicated data is sent to at least one other local node 102 or the central node 104, possibly in response to a request for the data.

The local and central nodes 102 and 104 implement respective local and central data repositories. The central data repository of the central node 104 illustratively comprises, among other types of stored data, replicated data received from local data repositories of respective ones of at least a subset of the local nodes 102.

The distributed contextual analytics framework in the present embodiment further comprises management and orchestration functions deployed at respective ones of at least a subset of the local and central nodes 102 and 104.

For example, a given one of the local nodes 102 comprises a local management and orchestration function that adapts one or more local service functions of the given local node based at least in part on results of local analytics performed by a local analytics function of the given local node.

In addition, the central node 104 comprises a central management and orchestration function that adapts one or more local service functions of respective ones of at least a subset of the local nodes 102 based at least in part on results of local analytics performed by respective local analytics functions of those local nodes.

The virtualization infrastructure providing resources for implementing the distributed nodes 102 and 104 in some embodiments comprises network functions virtualization (NFV) infrastructure and the resources of the virtualization infrastructure utilized to implement one or more of the distributed nodes 102 and 104 comprise one or more virtual network functions (VNFs) of the NFV infrastructure.

Such VNFs illustratively comprise one or more applications with each application implemented utilizing at least one of a virtual machine running on the NFV infrastructure and a container running on the NFV infrastructure.

An NFV management entity of the NFV infrastructure is configured to proactively monitor at least a subset of the distributed nodes 102 and 104 and to adjust resources allocated to those nodes in order to satisfy one or more policies.

In such an arrangement, the local and central nodes can be dynamically added to, modified in and deleted from portions of the system 100 in accordance with one or more specified policy criteria.

Also, in some embodiments, the local nodes are hierarchically distributed to facilitate scaling of at least portions of the system 100. For example, scale out and scale up mechanisms can be provided using hierarchically-distributed edge nodes of one or more operator or service provider networks.

At least a subset of the nodes 102 and 104 can be implemented at least in part as respective virtual appliances that can be reconfigured to support different functions within the system. Such appliances can be configured to include variable amounts of compute, network and storage resources as dynamically allocated from the virtualization infrastructure of the system responsive to end user demand, geographic location and other factors. By way of example, VNF instances can be used in some embodiments to support one or more edge or core nodes as respective virtual appliances.

The particular configuration of distributed nodes 102 and 104 in system 100 is presented by way of example only, and should not be construed as limiting in any way. Numerous other arrangements of local and central nodes can be used in implementing embodiments of the invention.

As mentioned previously, the distributed nodes 102 and 104 illustratively communicate with one another over one or more operator networks or other service provider networks. At least parts of one or more of such service provider networks, or other networks utilized in other embodiments, may illustratively comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the information processing system 100 are implemented using one or more processing platforms, examples of which will be described in greater detail below in conjunction with FIGS. 9 and 10. A given such processing platform comprises at least one processing device comprising a processor coupled to a memory, and the processing device may be implemented at least in part utilizing one or more virtual machines, containers or other virtualization infrastructure.

It should be understood that the particular arrangement of components implemented in the system 100 as illustrated in FIG. 1 are presented by way of example only. In other embodiments, additional or alternative sets of distributed nodes or other related components may be used, and such components may exhibit alternative functionality and configurations. For example, the distributed nodes of system 100 can be dynamically reconfigured over time responsive to end user demand and other factors.

The operation of the information processing system 100 will now be described in further detail with reference to the flow diagram of FIG. 2. The process as shown includes steps 200, 210, 215, 220, 225, 230 and 235, and is described with reference to components of the system 100 but is more generally applicable to other systems comprising distributed nodes including a plurality of local nodes 102 and at least one central node 104 arranged as disclosed herein.

Figure 2:
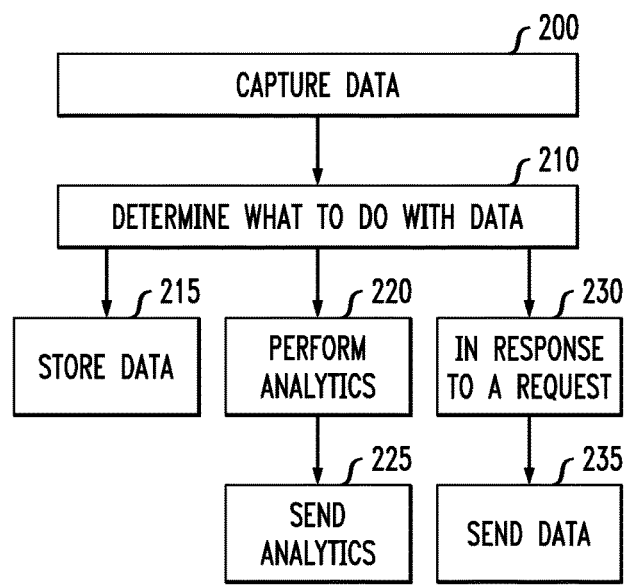
FIG. 2 is a flow diagram of an example distributed contextual analytics process implemented in the information processing system of FIG. 1.

The example functionality illustrated in FIG. 2 is provided as part of a distributed contextual analytics framework implemented at least in part by the local and central nodes 102 and 104.

In step 200, data is captured at one or more of the local nodes 102 of the system 100. For example, such data is illustratively captured utilizing at least one local data capture function implemented at a corresponding one of the local nodes 102.

In step 210, a determination is made as to what will be done with the captured data. This determination is illustratively made utilizing the distributed contextual analytics framework of the system 100.

In the present embodiment, the possible further processing for captured data includes storing at least a portion of the captured data at one or more local nodes 102 in step 215, performing analytics utilizing at least a portion of the captured data at one or more local nodes in step 220, and sending at least a portion of the captured data in step 235 from one or more local nodes 102 to another local node 102 or the central node 104, possibly in response to a corresponding request received in step 230.

Different instances of operations 215, 220 and 235 can be performed for different portions of the captured data. Additionally or alternatively, operations 215, 220 and 235 can be performed on the same portion of the captured data.

The analytics referred to in the context of step 220 illustratively include local analytics performed by one or more local nodes 102 on data captured at respective ones of those nodes. Accordingly, the sending of analytics in step 225 illustratively comprises sending results of such local analytics to the central node 104 for further processing. The local analytics can comprise, for example, simple pattern matching analytics, or other more complex analytics, as well as combinations of different analytics of different types.

From any of steps 215, 225 and 235, and possibly from other steps in the FIG. 2 process, the process flow can return to step 200 to capture additional data, or to step 210 to determine additional processing to be applied to previously-captured data and current data. Other types of flows between particular process steps and additional or alternative processing functions can be included in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations involving distributed contextual analytics functionality implemented in an information processing system. For example, the ordering of the process steps may be varied in other embodiments, or certain steps may be performed concurrently with one another rather than serially. Also, one or more of the process steps may be repeated periodically for different processing applications, or performed in parallel with one another. For example, parallel instantiations of one or more of the steps can be implemented through appropriate orchestration and workflows.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems with distributed contextual analytics functionality will now be described with reference to FIGS. 3 through 7.

Figure 3:
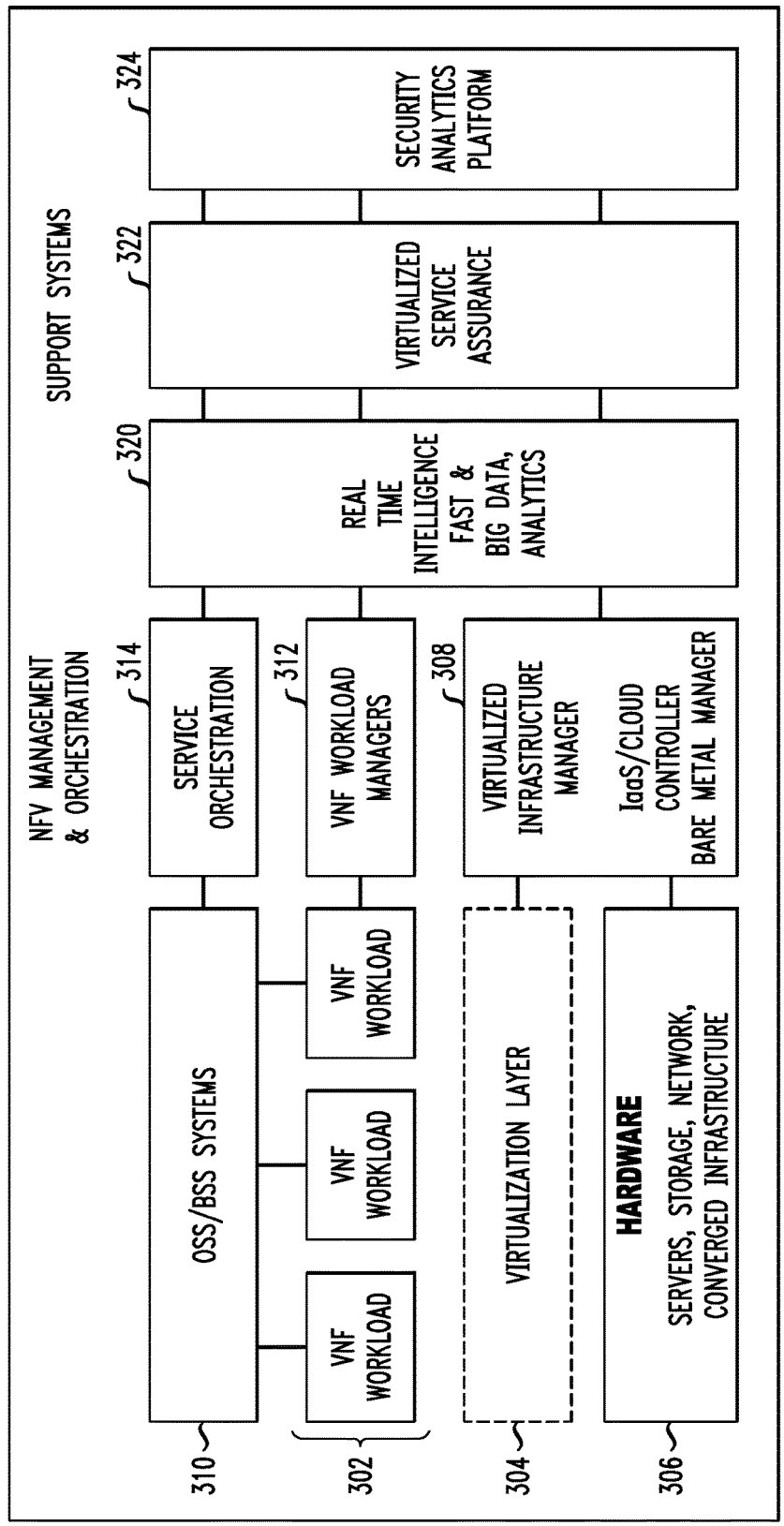
FIGS. 3-7 are block diagrams of other information processing systems with distributed contextual analytics functionality in illustrative embodiments.

Referring now to FIG. 3, an information processing system 300 in one embodiment comprises a plurality of VNF workloads 302. The VNF workloads 302 are examples of what are more generally referred to herein as "VNF instances" of an NFV framework, although other types of VNF instances can be used in other embodiments. The VNF workloads 302 are associated with a virtualization layer 304 of the system 300.

One or more of the VNF instances 302 are each illustratively configured to provide at least a portion of the distributed contextual analytics functionality associated with one or more local or central nodes of the system 300. The virtualization layer 304 runs on underlying hardware 306 which illustratively comprises servers, storage, network and converged infrastructure resources, under the control of a virtualized infrastructure manager 308. The virtualized infrastructure manager 308 in this embodiment comprises an infrastructure-as-a-service (IaaS) manager, a cloud controller and a so-called "bare metal" manager, where "bare metal" refers to physical infrastructure elements that do not include an operating system, and may include at least a portion of the physical infrastructure elements provided in this embodiment by hardware 306.

Figure 9:
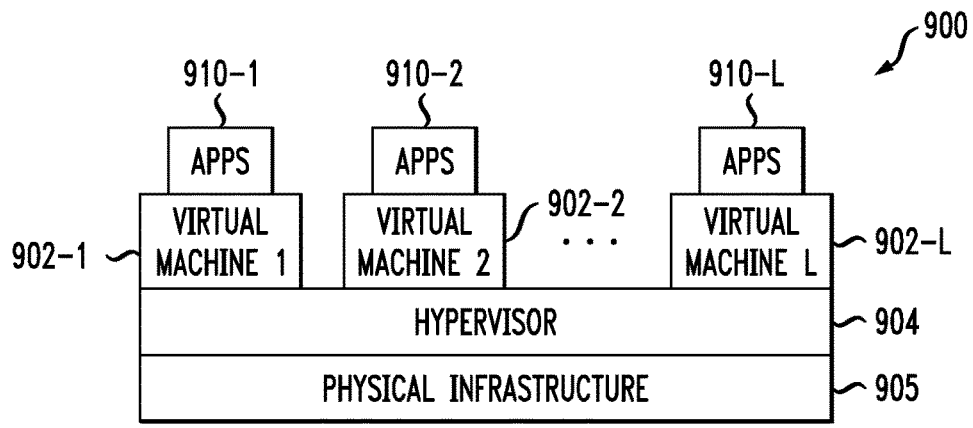
FIGS. 9 and 10 show examples of processing platforms that may be utilized to implement at least a portion of at least one of the information processing systems of FIGS. 1 and 3-7.
Figure 10:
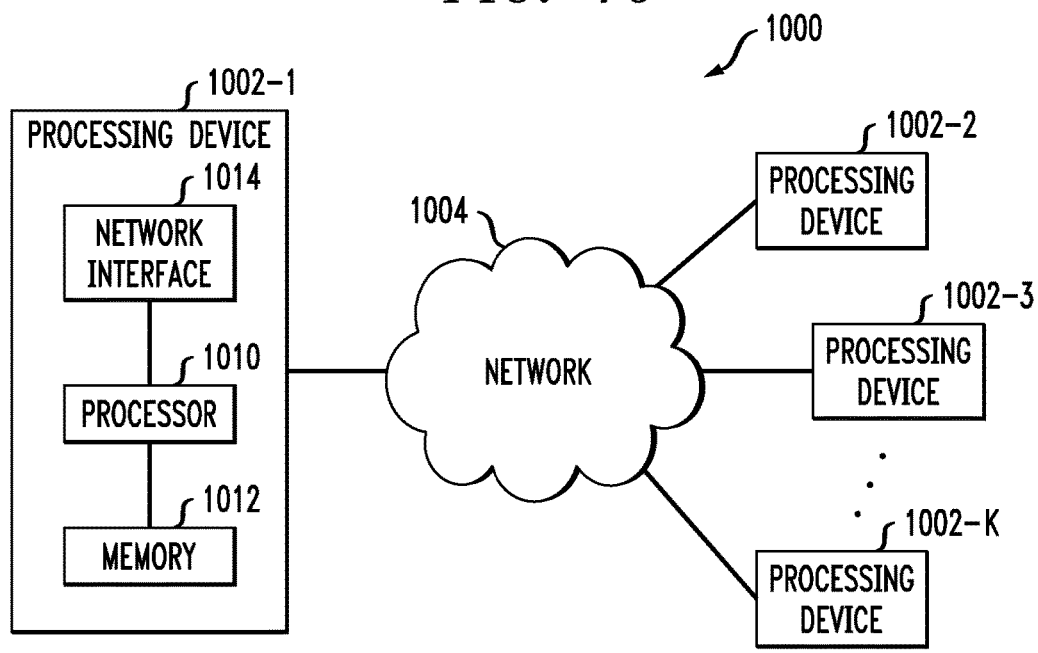

The VNF workloads 302, virtualization layer 304, hardware 306 and virtualized infrastructure manager 308 may be collectively viewed as one example of what is more generally referred to herein as "virtualization infrastructure." Other types of virtualization infrastructure can be used in other embodiments, including the example processing platform of FIG. 9. The VNF workloads 302 in this embodiment are assumed to comprise respective applications running inside containers of the virtualization infrastructure or on one or more virtual machines of the virtualization infrastructure.

The VNF workloads 302 are controlled at least in part by support systems 310 which comprise an operations support system (OSS) and a business support system (BSS). Additional control functionality for the VNF workloads 302 is provided by VNF workload managers 312 and service orchestration module 314.

The VNF workload managers 312 and service orchestration module 314 collectively comprise one example of what is more generally referred to herein as an NFV management entity, although in this particular embodiment more specifically denoted in the figure as an NFV management and orchestration entity.

In the FIG. 3 embodiment, distributed contextual analytics middleware running as one or more of the VNF workloads 302 is used to implement at least a portion of one or more local or central nodes of the system 300. Such distributed contextual analytics functionality can be more particularly implemented, for example, utilizing one or more virtual machines of the virtualization infrastructure under the control of the NFV management and orchestration entity. That entity can illustratively support add, modify and delete operations relating to the one or more virtual machines utilized to implement the given local or central node.

Additional support systems associated with virtualized infrastructure manager 308, VNF workload managers 312 and service orchestration module 314 in the information processing system 300 include an analytics module 320 providing real-time intelligence for "fast data" and "big data" analytics, a virtualized service assurance module 322, and a security analytics platform 324.

The NFV infrastructure supporting VNF workloads 302 in the system 300 can be used to virtualize various types of functionality previously only available using proprietary hardware. Moreover, the VNF workloads enable new services previously not available on proprietary hardware to be virtualized and deployed using pools of compute, network and storage resources of the NFV infrastructure.

It is to be appreciated that the particular arrangement of modules and other components of the system 300 and other information processing systems described herein is illustrative only, and should not be construed as limiting in any way. Numerous alternative arrangements of modules and other components can be used in other embodiments.

Figure 4:
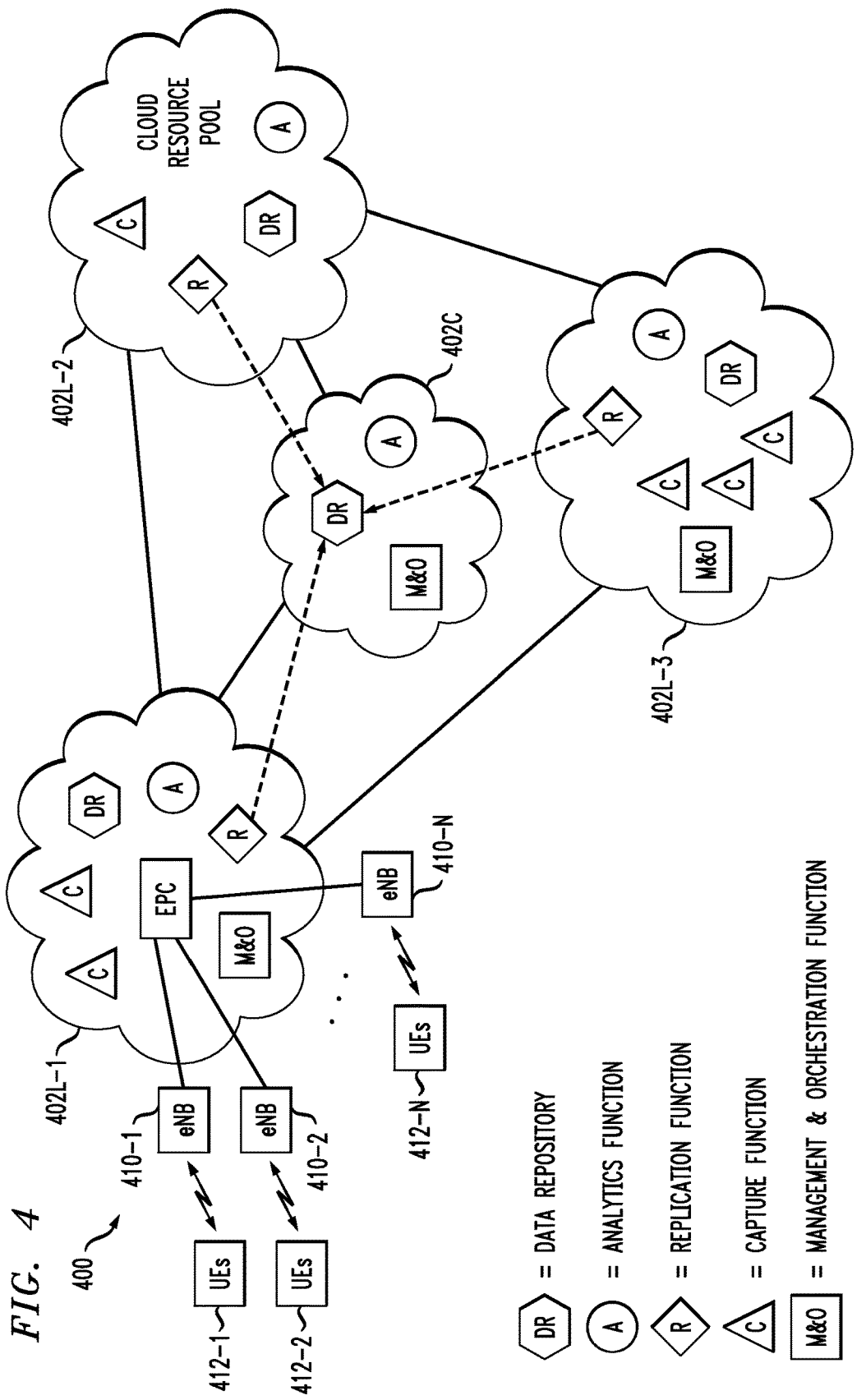

FIG. 4 shows an information processing system 400 in another embodiment of the invention. The system 400 comprises local portions 402L-1, 402L-2 and 402L-3, each comprising one or more local nodes, and a central portion 402C comprising at least one central node. Each of the portions 402 is implemented utilizing resources from respective cloud resource pools of virtualization infrastructure of the system 400.

The local portion 402L-1 in the present embodiment is associated with a telecommunications service provider network, and more particularly a wireless cellular network configured in accordance with the Long Term Evolution (LTE) standards of the 3G Partnership Project (3GPP). A 3GPP LTE network of this type comprises an Internet protocol (IP) based packet core referred to as an Evolved Packet Core (EPC). In the present embodiment, at least portions of the EPC are implemented using resources of virtualization infrastructure in the cloud resource pool of the local portion 402L-1. Such resources may more particularly comprise VNF instances of NFV infrastructure.

The system 400 further comprises a plurality of base stations 410 each implemented as an evolved Node B (eNB). The eNBs 410-1, 410-2, . . . 410-N are illustratively part of an access network of the LTE network. The access network comprises, for example, an Evolved Universal Terrestrial Radio Access Network (E-UTRAN). The eNBs 410-1, 410-2, . . . 410-N communicate over respective air interfaces with respective sets of user equipment (UEs) denoted as UEs 412-1, 412-2, . . . 412-N.

Other operator or service provider networks may be used in the system 400 to support communication between the distributed nodes of the various local and central portions 402 of the system.

The local and central portions 402 also implement respective local and central data repositories ("DR"). Such data repositories can comprise, for example, "big data" repositories with real-time and/or non-real-time data ingest functionality.

The distributed nodes of the system 400 as implemented in the local and central portions 402 implement at least portions of a distributed contextual analytics framework. The framework in this embodiment illustratively includes at least one analytics function ("A") in each of the portions 402.

The analytics functions associated with the local nodes of the local portions 402L-1, 402L-2 and 402L-3 are examples of what are also referred to herein as local analytics functions. The analytics function associated with the central node 402C is an example of what is also referred to herein as a central analytics function. One or more of the analytics functions can comprise or otherwise be associated with various related machine learning functions. Such machine learning functions are considered examples of "analytics functions" as the latter term is broadly utilized herein.

The distributed contextual analytics framework also includes a plurality of additional functions implemented in one or more of the portions 402. For example, each of the local portions 402L includes at least one replication function ("R") and at least one capture function ("C"). Some of the local and central portions each also include at least one management and orchestration function ("M&O").

The replication functions are illustratively implemented as policy-controlled functions that selectively replicate data from one repository to another, although other types of replication functions can be used in other embodiments.

The capture functions are illustratively configured to provide localized real-time and/or non-real-time data collection functionality to support the data ingest functionality of the data repositories.

The management and orchestration functions control management and orchestration of services provided using the virtualization infrastructure. For example, the management and orchestration functions can combine or otherwise arrange particular ones of the resources to provide a particular service to an end user within the system 400. The term "orchestration" as used herein is intended to be broadly construed so as to encompass such arrangements as well as alternative techniques for controlling initiation of services utilizing combinations or other arrangements of selected ones of a plurality of resources.

More particularly, the management and orchestration functions can be used to provision, control and manage subordinate functions that deliver particular services in the system 400. Such services can relate, for example, to mobile telephony services, factory or other machine control services, Internet services, application services, cloud services, etc.

The management and orchestration functions at one or more of the local portions 402L and central portion 402C can also be configured to take one or more corrective actions to recover from at least one SLA violation. Such corrective actions may relate, for example, to SLA violations that are due to availability failures in physical resources such as compute, network or network resources, availability failures in a virtualization layer that overlies the physical resources, and performance failures such as degradation in available network bandwidth or in available processor or memory resources on a virtual machine or other compute node.

One or more of the portions 402 can include additional or alternative functions, such as one or more additional software functions operating in a cloud resource pool.

In the FIG. 4 embodiment, the various portions 402 can be interconnected by one or more networks, communication fabrics or other communication media.

The system 400 is advantageously configured to provide certain advantages relative to conventional arrangements. For example, a given 3GPP LTE network can include tens of thousands of eNB elements, each collecting or otherwise capturing approximately 100 Mbytes of OAMP ("Operations, Administration, Maintenance and Provisioning") data on a daily basis. In conventional systems, this data is backhauled to regional or central offices or other data centers for non-real-time processing. The system 400 avoids the need to backhaul large portions of the data by implementing analytics functionality closer to the local data capture points. Moreover, the analytics can be performed locally in substantially real time, with results being sent to the central node as needed for further processing. Such local analytics are particularly beneficial in facilitating detection and blocking of threats and associated unauthorized traffic at the edge of the 3GPP LTE network. For example, the local analytics can facilitate hierarchical threat detection and management at the edge of the network in order to address denial of service attacks as well as other types of attacks. The distributed contextual analytics framework can allocate additional resources to handle such attacks, and can additionally or alternatively allocate additional resources to handle user requests in another location to circumvent such attacks.

Accordingly, the FIG. 4 embodiment provides significant reductions in the amount of backhauled data, thereby reducing network congestion, while also achieving improvements in analytics performance. In addition, this embodiment provides a virtual environment for meeting service needs, facilitating the configuration of new services and operational models not feasible under conventional practice. For example, the distributed contextual analytics framework implemented using local and central nodes in the system 400 can be used to provide functionality relating to distributed access and distribution systems, including broadband access systems and content delivery networks (CDNs).

As a more particular example, the FIG. 4 system can be configured to provide layering of virtual services and groups over the 3GPP LTE network. In such an arrangement, a group of network subscribers may be added to a virtual subscriber group. The virtual subscriber group may be serviced by a set of virtualized resources allocated to the subscriber group, where the virtualized resources are implemented using underlying physical resources. The virtualized resources may be periodically reconfigured over the underlying physical resources to ensure that the virtual subscriber group is provided with a certain level of service. Additional virtualized resources may be provisioned and allocated to serve the virtual subscriber group if the level of service is not being met.

Figure 5:
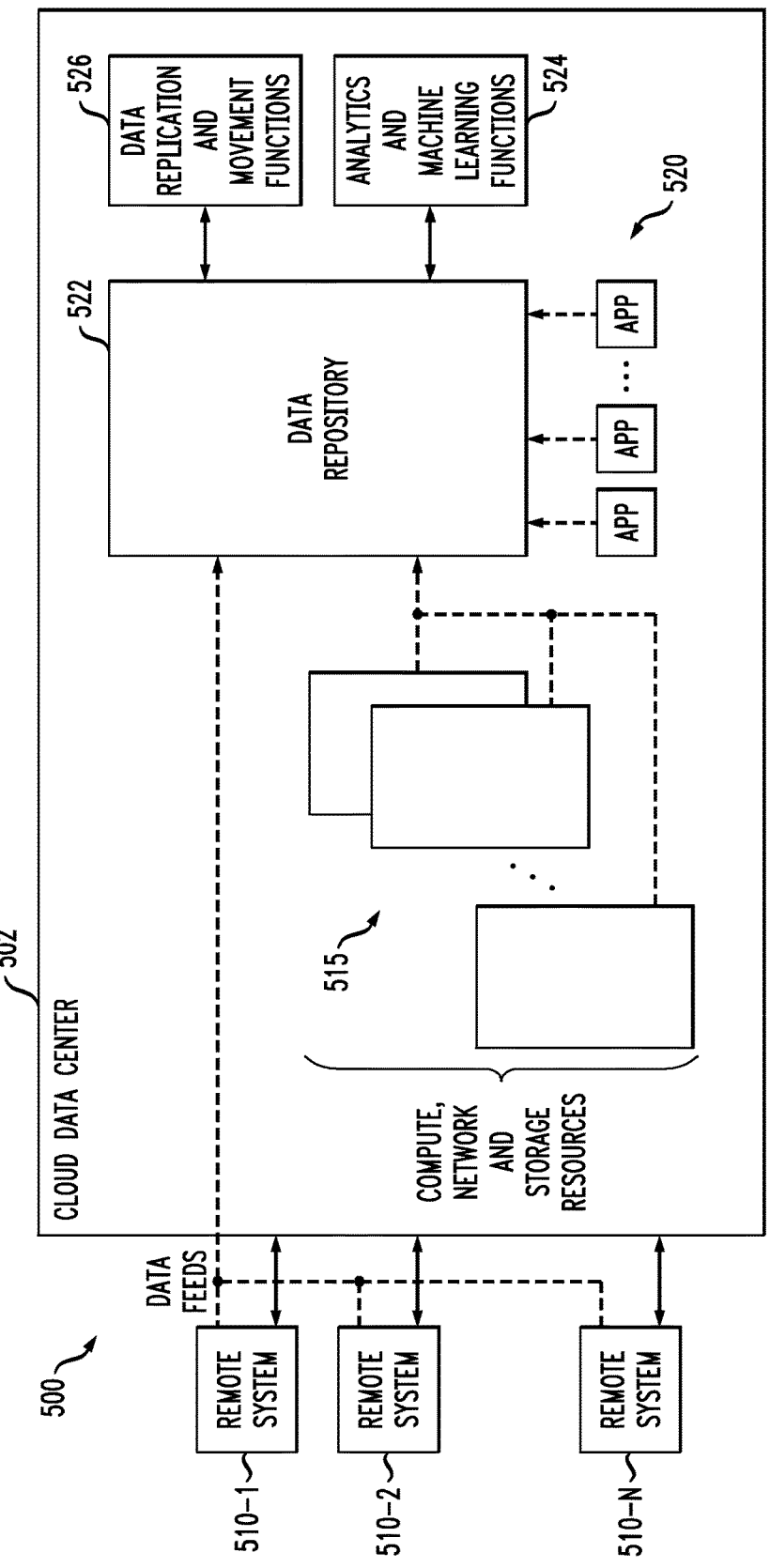

Referring now to FIG. 5, an information processing system 500 in another embodiment includes a cloud data center 502 coupled to a plurality of remote systems 510-1, 510-2, . . . 510-N. The cloud data center 502 includes a resource pool comprising compute, network and storage resources 515 supporting a plurality of applications 520. The cloud data center 502 further comprises a data repository 522 that interacts with data replication and movement functions 526 and analytics and machine learning functions 524.

Data feeds from the remote systems 510, the compute, network and storage resources 515 and the applications 520 are provided to the data repository 522 for storage. Accordingly, data feeds in the system 500 come from multiple source elements.

The multiple source elements providing data feeds in the system 500 can include local physical infrastructure systems such as, for example, computers, servers, storage devices, network devices, physical security systems, HVAC ("Heating, Ventilation and Air Conditioning") systems, or other types of physical systems in a data center, switching center, central office or other facility of the system 500.

Data feeds can also come from various types of virtualization infrastructure, including cloud management and orchestration systems, hypervisors, operating systems, software-defined networks (SDNs), storage controllers, development operations systems, application performance management systems, service assurance systems, billing systems and monitoring systems.

Other types of data feeds can include applications or other software functions operating on cloud resources in a data center, as well as external systems that may or may not interact with cloud resources.

The corresponding stored data derived from the data feeds is further processed by the functions 524 and 526 to implement the associated functionality. This functionality illustratively comprises at least a portion of a distributed contextual analytics framework implemented within the system 500.

By way of example, the cloud data center 502 can be used to implement one or more local nodes of the distributed contextual analytics framework. In such an arrangement, the data repository 522 comprises a local data repository, and the functions 524 and 526 comprise local functions of the local nodes. The remote systems 510 can illustratively comprise eNBs of a telecommunications network as in the FIG. 4 embodiment, or other types of local data sources for which local analytics can be provided using local nodes of the distributed contextual analytics framework.

Portions of the cloud data center 502 can additionally be utilized to implement one or more central nodes of the distributed contextual analytics framework.

Figure 6:
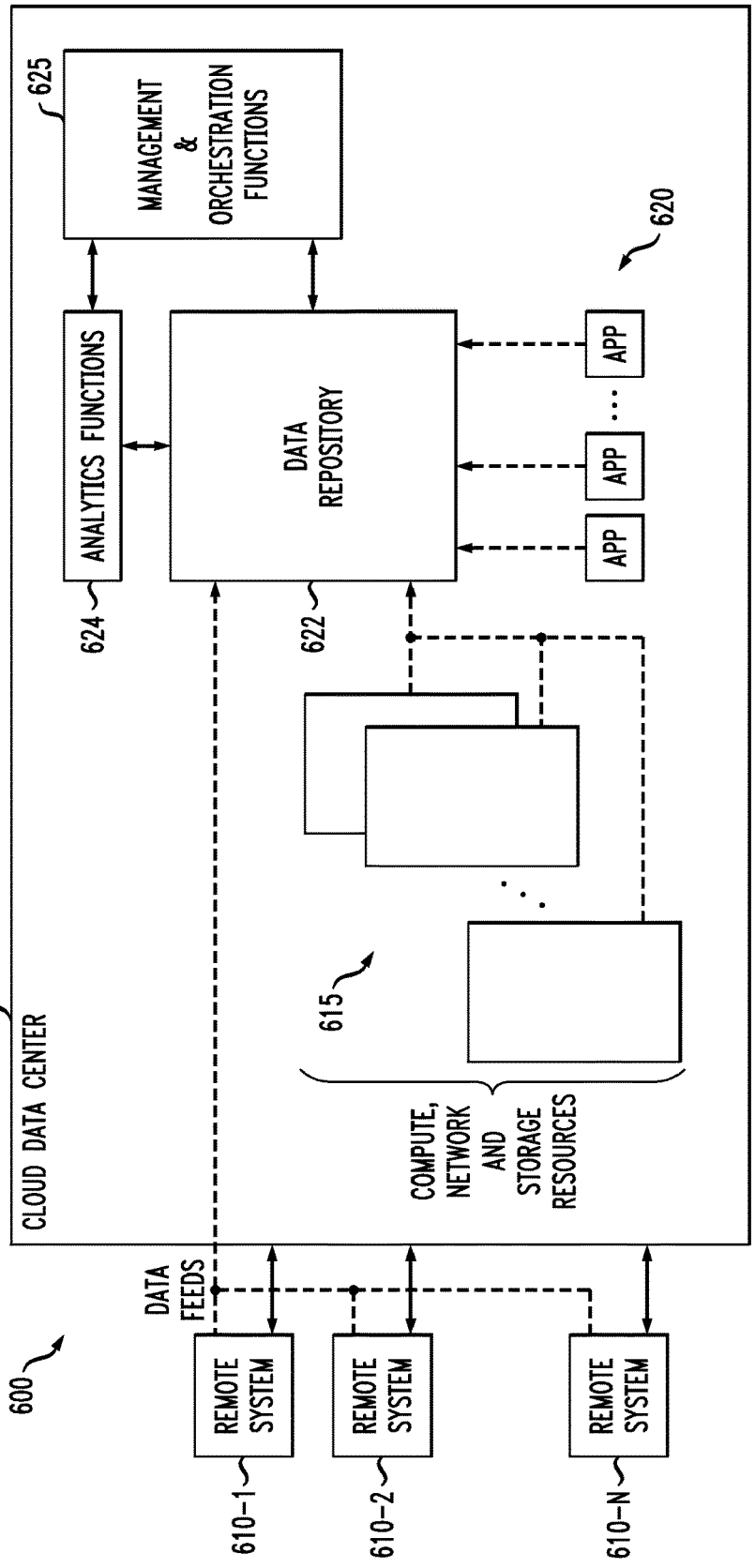

Another embodiment of an information processing system is shown in FIG. 6. In this embodiment, a cloud data center 602 interacts with remote systems 610-1, 610-2, . . . 610-N and includes a pool of compute, network and storage resources 615 supporting applications 620. The cloud data center 602 also includes a data repository 622 that receives data feeds from the remote systems 610, compute, network and storage resources 615, and applications 620, in a manner similar to that previously described in the context of the FIG. 5 embodiment. However, the cloud data center 602 in the present embodiment comprises analytics functions 624 and management and orchestration functions 625 that are coupled to and interact with data repository 622. The management and orchestration functions 625 in this embodiment are configured to control resources 615, applications 620, and other associated virtual or physical components of the cloud data center 602.

The cloud data center 602, like the cloud data center 502 of FIG. 5, can be utilized to implement at least one local node and possibly also one or more central nodes of a distributed contextual analytics framework.

Such a distributed contextual analytics framework can include multiple instances of cloud data centers such as cloud data centers 502 or 602, each implementing one or more local or central nodes. For example, different instances of a cloud data center can be used to implement different local or central portions 402 of the system 400 of FIG. 4.

The system 600 is configured to provide analytics-driven autonomic control functionality, including analytics-driven autonomic service adaptation. For example, based on an analysis of data in the data repository 622 performed by analytics functions 624, the behavior of one or more components of the cloud data center 602 or the remote systems 610 is adjusted to resolve an identified condition or other issue, possibly via involvement of the management and orchestration functions 625. Identified conditions or other issues that can be addressed in this manner may relate, for example, to performance, security, customer experience, operational costs, fault situations or combinations thereof.

Analytics-driven controls are implemented in the system 600 at least in part via analytics functions 624 and management and orchestration functions 625 that respond to these and other conditions in order to trigger pre-defined responses, or responses that are created dynamically based on algorithmic mechanisms. For example, one or more management and orchestration functions 625 can be configured to enforce and verify the invocation of a requested control response by one or more of the analytics functions 624. It is also possible that one or more of the management and orchestration functions 625 can monitor outputs of the analytics functions 624 and trigger responses based on those outputs.

Figure 7:
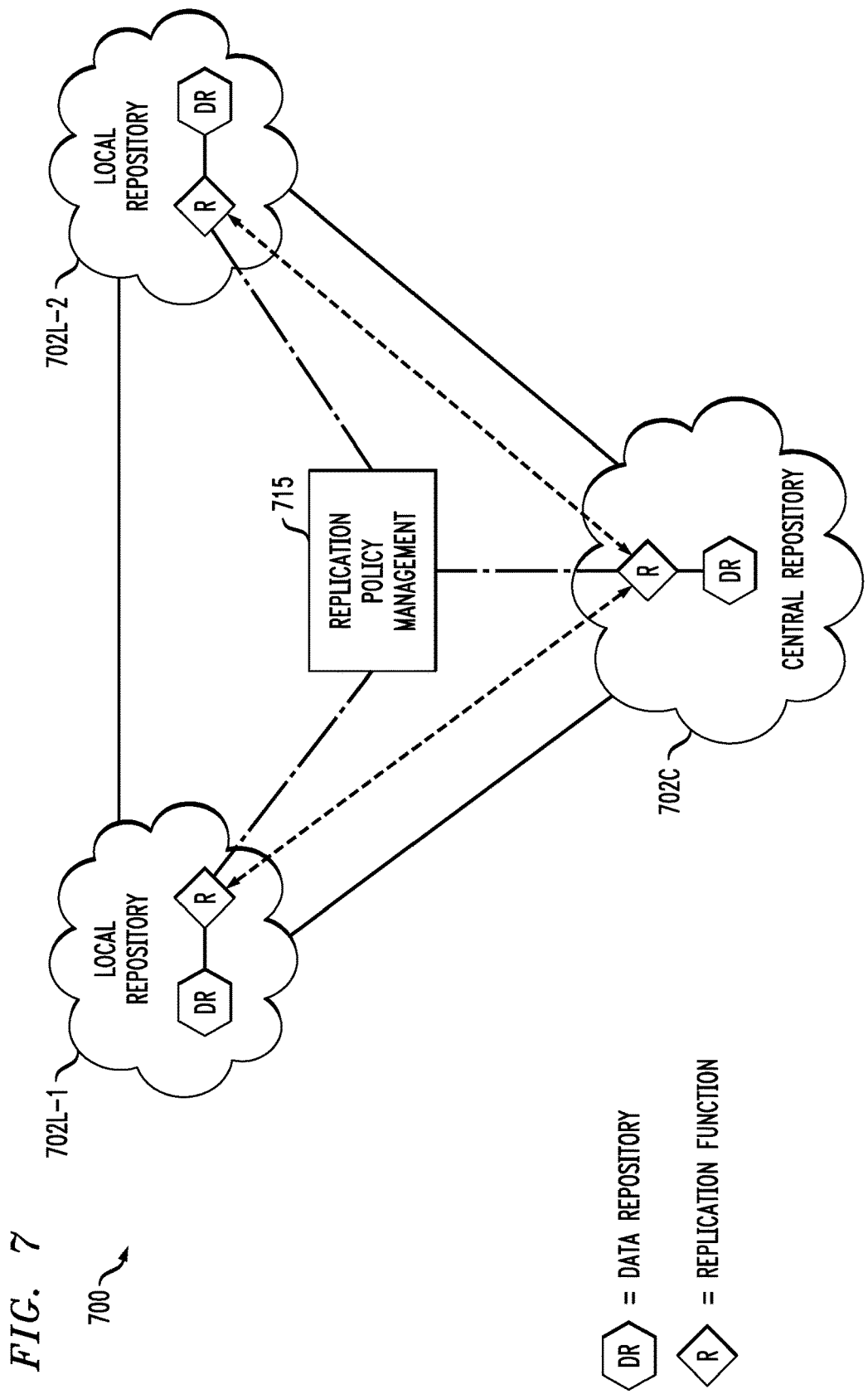

FIG. 7 shows another information processing system 700 that includes a distributed contextual analytics framework. In this embodiment, local portions 702L-1 and 702L-2 of the system 700 comprise respective local data repositories ("DR") coupled to corresponding replication functions ("R"). A central portion 702C comprises a central repository ("DR") coupled to a corresponding replication function ("R"). As in the FIG. 4 embodiment, each of the local portions 702L is assumed to implement one or more local nodes of the distributed contextual analytics framework, and the central portion 702C is assumed to implement at least one central node of the distributed contextual analytics framework.

Also included in the system 700 is a replication policy management module 715 coupled to each of the replication functions. The replication policy management module 715 controls the operation of the replication functions based on one or more specified policies or associated policy criteria.

The particular distributed contextual analytics embodiments illustrated in conjunction with the systems of FIGS. 1 and 3-7 are exemplary only, and numerous other arrangements of local and central nodes, as well as corresponding virtual machines, containers, management entities and other components, can be used in other embodiments. For example, in some embodiments, only subsets of these components, or additional or alternative sets of components, may be used, and such components may exhibit alternative functionality and configurations.

A number of additional examples of various implementations of distributed contextual analytics embodiments will now be described.

An information processing system can be configured to allow distributed contextual analytics to be performed on video streams from respective servers distributed across an operator network or a service provider network of a telecommunication system or cable system. Such an arrangement can be used, for example, to distribute video to particular parts of the network that are expected to exhibit high demand.

A distributed contextual analytics framework as disclosed herein can be implemented in a network with reservoirs of compute, network and storage resources and associated analytical capabilities. The distributed contextual analytics framework, in some embodiments, may provide a framework for analytics that are applied to a complex distributed environment, such as a cloud environment or other virtual environment. In further embodiments, an analytical framework may be applied to an environment where physical appliances have been virtualized.

A distributed contextual analytics framework may be configured to enable distribution of analytics, processing, and storing of data across a network spanning large geographical areas with disperse processing, storing and analytical capabilities. In certain embodiments, a framework may distribute data to parts of the network where the data may need to be accessed. In other embodiments, data generated at different parts of the network may be selectively transferred to other parts of the network based on access requests to the data. In further embodiments, data may be analyzed in the portion of the network were the data is generated and the analytics relating to the data may be transferred to other parts of the network. In at least some embodiments, the framework may enable latency or bandwidth problems to be overcome. In certain embodiments, bandwidth traffic may be limited by determining what information needs to be sent to other parts of the network.

A distributed contextual analytics framework can be configured to implement distributed contextual analytics with policy-based autonomic service adaptation, which may enhance data capture and analysis from distributed systems, to enable management and policy based automation systems to leverage the analysis to make localized and global system adaptive changes or other decisions.

In certain embodiments, computing and communications system architectures when deployed in complex service infrastructures such as those used in public cloud services or telecommunication services may face a number of technical hurdles that may impact the viability of modern "big data" analytics and other analytics systems. Typically, some of these hurdles may include system tolerance for latency in data acquisition, cost of bandwidth to transport data and the ability to act on the data in a real-time manner when the data source and the analysis functions are at distances where the actual communications latency conventionally prevents automation systems from initiating a response to adapt to the analysis in a time frame which is meaningful to real-time systems.

In certain embodiments, a distributed contextual analytics framework may address some of the key hurdles to implementing big data, analytics and adaptation functions in large systems by leveraging a distributed, data acquisition and contextual analytics platform. In some embodiments, a distributed contextual analytics platform may distribute real-time data acquisition systems and non-real-time data acquisition systems across a footprint of complex system based on parameters defined, which may ensure cost effectiveness or address some physical constraint such as ingest latency. In at least some embodiments, a distributed architecture may be hierarchical, which may allow for global analysis of the data. In at least one embodiment, an operator of an architecture may selectively aggregate information to a central system in certain cases and may not copy all data to the core system.

In certain embodiments, a distributed contextual analytics framework may include a function that may allow for selective replication of a portion of a data set to a core aggregation function, at points of distributed data ingest, whether by a pre-provisioned policy or machine learning based behavioral trigger or other such functions. In further embodiments, the disclosure may enable co-location of an analytics function that may analyze and correlate locally ingested data, which may enable near-real-time or minimal time delayed analysis of data that may be only useful if revealed within a short time window or when it doesn't make sense to copy to a core repository due to a technical or financial constraint. In still further embodiments, a distributed contextual analytics framework may enable automated responses to be executed by a function that leverages the localized or aggregate data analysis to trigger some sort of system level response, such as the instantiations of incremental service system resources, fine tuning of an operating system, or moving a virtual system from one physical resource to another.

In some embodiments, a distributed contextual analytics framework may enable a big data optimized storage system, in the form of a dedicated appliance or software based implementation. In a particular embodiment this may be GemFire embedded within ScaleIO. In some embodiments, a real-time data stream ingest engine with associated data retention capabilities and analytics function modules may support various applications such as machine learning based network optimization and customer experience management. In an embodiment SpringXD may be combined with GemFire to provide real-time SQL/alerts and HAWQ & PivotalHD may be leveraged to generate reports on historical data and/or to provide access to data scientists for further analysis.

In certain embodiments, the combination of these functions may fundamentally change the manner in which storage, security and analytics are used and leveraged in the context of the distributed systems. In certain embodiments, rather than implementing commoditized disk or hierarchical storage management (HSM) arrangements, a distributed contextual analytics framework can be used to implement a storage analytic solution in order to help mobile operators create meaningful data ponds where time-sensitive data can be harvested in real-time and feed a larger and more traditional data lake model.

In other embodiments, a distributed contextual analytics framework is configured to leverage a central data repository for creating new algorithms to analyze streaming data and push those algorithms out to edge nodes in the carrier infrastructure. Such an arrangement can effectively change what data gets generated on the edge and back-hauled to a data center. In other embodiments, a one-time query can be written in a central repository that looks at the historical data at the edge, distributes that query to all edge nodes in the carrier infrastructure, and returns the results centrally.

In certain embodiments, a distributed contextual analytics framework can enable a data lake that allows for the localized ingest and retention of real-time data, near-real-time data and non-real-time data for the purposes of ensuring service scalability, cost effectiveness and the ability to enable analytic functions that by requirement must be close to the data sources such that real-time adaptive responses in some aspect of the operation of external systems may be made possible.

In other embodiments, a distributed contextual analytics framework may provide a function that may selectively replicate data from one of many localized pools to a central core repository for use in analytic processes, which may require the ability to correlate across all regions of the distributed data lake. In some embodiments, the mechanism to decide on what data is replicated may be a manual one, such as one where the system operator selects what specific data or types of data or data of a defined characteristic should be replicated. In further embodiments, another mechanism may be based on machine learning systems or behavioral analysis systems which may determine what data should be replicated based on algorithmic or self-learned criteria.

In certain embodiments, a distributed contextual analytics framework may enable hierarchical distributed analytics and a number of related services including threat detection and network security, customer experience churn management, service yield management, and predictive infrastructure failure response in the context of a large distributed system. These and other analytics contextual applications are readily scalable.

In further embodiments, a distributed contextual analytics function may be co-located or in a relevant proximity to the distributed data ingest in the localized portions of the data lake. Such localized portions of a data lake are also referred to herein as "data ponds." In some embodiments, functions may perform analysis of whatever data is provided to them for a number of purposes, such as security and system protection, operational optimization, service yield or other economic management, and end user experience and satisfaction management.

In some embodiments, by performing analytics near the source of the data, a distributed contextual analytics framework may permit sending a summary of important data to a central site, thus alleviating the need for large transport capacity in the network.

In certain embodiments, creating new algorithms through analysis of central repository data, and pushing such algorithms out to all nodes in the carrier infrastructure, may change the contextual analytic behavior of the edge nodes. In further embodiments, each node or cluster of nodes may run differing types of algorithms based on policy.

In other embodiments, a distributed contextual analytics framework may enable performing of analytics distributed across a large scale network, which may provide the ability to perform near real-time analytics and take appropriate action in a virtualized infrastructure environment. In certain embodiments, applications may include the optimization, protection and fine tuning of broadband access systems, CDN systems, mobile communications systems, media and entertainment delivery systems, and numerous other types of information processing systems.

In some embodiments, a distributed contextual analytics framework can be implemented in a cloud service provider environment to enable service offerings such as Infrastructure-as-a-Service (IaaS), Platform-as-a-Service (PaaS) and Software-as-a-Service (SaaS).

Again, the above-described embodiments are presented as illustrative examples only, and should not be construed as limiting in any way.

At least portions of a given one of the systems of FIGS. 1 and 3-7 are implemented using one or more processing platforms, examples of which will be described in greater detail below in conjunction with FIGS. 9 and 10. A given such processing platform comprises at least one processing device comprising a processor coupled to a memory, and the processing device may be implemented at least in part utilizing one or more virtual machines, containers or other virtualization infrastructure.

A given information processing system as disclosed herein illustratively comprises one or more storage systems such as VNX® and Symmetrix VMAX®, both commercially available from EMC Corporation of Hopkinton, Mass. Other types of storage elements can be used in implementing an information processing system or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of an information processing system as disclosed herein.

The operation of another illustrative embodiment of an information processing system implementing distributed contextual analytics functionality will now be described with reference to the flow diagram of FIG. 8. The process as shown includes steps 800 through 806, and is suitable for use in one or more of the systems of FIGS. 1 and 3-7 as previously described, as well as other types of information processing systems.

In step 800, virtualization infrastructure is provided in the information processing system. Examples of such virtualization infrastructure were previously described in conjunction with FIGS. 1 and 3-7.

In step 802, distributed nodes are implemented at least in part utilizing resources of the virtualization infrastructure. For example, one or more of the nodes may comprise one or more VNF instances of an NFV framework of the virtualization infrastructure.

The distributed nodes implemented in step 802 collectively provide at least a portion of a distributed contextual analytics framework comprising analytics functions deployed at respective ones of the nodes. This may involve, for example, configuring respective ones of the nodes as a plurality of local nodes and at least one central node, providing a local analytics function and a local data capture function in each of at least a subset of the local nodes, and providing a central analytics function in the central node.

In step 804, the local analytics function at a given one of the local nodes is utilized to perform local analytics on data captured by the local data capture function at the given local node.

In step 806, results of the local analytics from the given local node are sent to the central node for further processing by the central analytics function.

The operations of steps 804 and 806 can be similarly performed for additional ones of the local nodes, with local analytics functions of each of those additional local nodes being utilized to perform local analytics on data captured by the corresponding local data capture functions, and the results of the local analytics being sent to the central node for further processing by the central analytics function.

Additional or alternative operations can be performed in this or other embodiments. For example, implementation of the distributed nodes in step 802 may additionally or alternatively comprise providing a local data replication function and a local data capture function in each of at least a subset of the local nodes, replicating at least a portion of the data captured by the local data capture function of a given one of the local nodes, and sending the replicated data from the given local node to at least one other local node or the central node. Similar operations can be performed for additional ones of the local nodes.

As another example, implementation of the distributed nodes in step 802 may additionally or alternatively comprise providing a local analytics function and one or more local service functions in each of at least a subset of the local nodes, providing in the central node a central management and orchestration function, and utilizing the central management and orchestration function of the central node to adapt the one or more local service functions of the given local node based at least in part on results of local analytics performed by the local analytics function of that local node. Again, these or other similar operations can be performed for additional ones of the local nodes.

Figure 8:
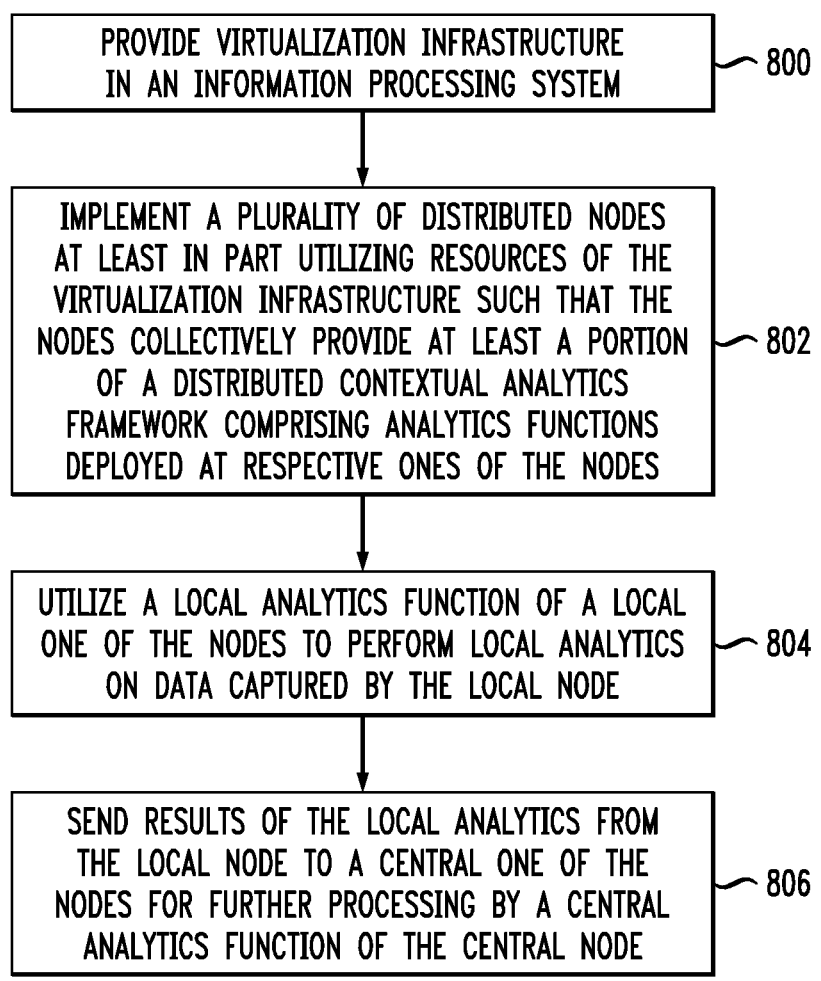
FIG. 8 is a flow diagram of an example process involving distributed contextual analytics implemented in an information processing system in an illustrative embodiment.

In addition, in one possible implementation of the FIG. 8 process, an NFV management entity such as NFV management and orchestration entity of FIG. 3 can be configured to proactively monitor one or more of the distributed nodes and to adjust resources allocated to those nodes in order to satisfy one or more policies. This may include policies associated with ensuring a particular level of end user experience. In the presence of relatively high demand from end users, additional nodes can be deployed within a given portion of the system. Similarly, at times of relatively low demand, one or more nodes can be taken down or otherwise removed from the given portion of the system.

As another example, a given one of the distributed nodes can be configured to request an increase or decrease in its allocated resources via the NFV management entity in order to implement a scaling up or a scaling down of the given node.

As a further example, the NFV management entity can be configured to adjust resources allocated to one or more of the distributed nodes responsive to requests for data from one or more other ones of the distributed nodes. It is also possible for distributed nodes to be added or deleted based at least in part on such requests.

Hybrid approaches involving various combinations of different aspects of the above-described examples can be used, as will be appreciated by those skilled in the art.

The particular processing operations and other system functionality described in conjunction with the flow diagram of FIG. 8 are presented by way of illustrative example only, and should not be construed as limiting the scope of the invention in any way. Alternative embodiments can use other types of processing operations involving distributed nodes implementing distributed contextual analytics functionality. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Advantageously, one or more of the illustrative embodiments avoid the need to plan particular sizes, locations and bandwidths for physical analytics resources up front based on projected end user demand, and instead allow available virtual resources to be allocated dynamically among distributed nodes based on actual end user demand. Capital expenditure associated with deployment of analytics functionality is thereby considerably reduced. Underutilization and overutilization of physical analytics resources can be effectively eliminated, providing improved overall system performance and a better end user experience.

In addition, one or more of the illustrative embodiments can be made highly scalable through scale out and scale up mechanisms including hierarchically-distributed nodes, and potentially facilitate the creation of new business models for both telecommunication system and cable system service providers.

Furthermore, techniques disclosed herein facilitate the implementation of real-time or near real-time analytics in a virtualized infrastructure environment. Appropriate actions can be taken to adjust the configuration of a given set of distributed nodes providing distributed contextual analytics functionality based on service assurance metrics and numerous other factors.

It was noted above that at least portions of the information processing systems of FIGS. 1 and 3-7 may be implemented using one or more processing platforms. Illustrative embodiments of such platforms will now be described in greater detail.

As shown in FIG. 9, portions of the information processing systems may comprise cloud infrastructure 900. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, a given information processing system may of course include multiple hypervisors each providing a set of virtual machines using at least one underlying physical machine. Different sets of virtual machines provided by one or more hypervisors may be utilized in configuring multiple instances of local or central nodes or other components of the system.

An example of a commercially available hypervisor platform that may be used to implement hypervisor 904 and possibly other portions of the given information processing system in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the given information processing system.

One or more of the processing modules or other components of an information processing system as disclosed herein may therefore each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of an information processing system and includes a plurality of processing devices, denoted 1002-1, 1002-2, 1002-3, . . . 1002-K, which communicate with one another over a network 1004. The network 1004 may comprise any type of network, including by way of example an operator network or other service provider network. At least parts of these or other networks utilized in embodiments of the invention may comprise, for example, a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. Such memory can also include other types of storage devices, such as storage disks or storage arrays. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and an information processing system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a given information processing system. Such components can communicate with other elements of the information processing system over any type of network or other communication media.

As indicated previously, local or central nodes or other components of an associated information processing system as disclosed herein can be implemented at least in part in the form of one or more software programs stored in memory and executed by a processor of a processing device such as one of the virtual machines 902 or one of the processing devices 1002. For example, at least portions of one or more of the local or central nodes in one or more of the embodiments described herein are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and processing devices. Also, the particular configurations of system and device elements shown in FIGS. 1, 3-7, 9 and 10 can be varied in other embodiments. Thus, for example, the particular types and arrangements of local or central nodes and other related system entities and other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising:
virtualization infrastructure; and
a plurality of distributed nodes implemented at least in part utilizing resources of the virtualization infrastructure;
the distributed nodes comprising a plurality of local nodes and at least one central node interconnected in one or more networks;
wherein the distributed nodes collectively provide at least a portion of a distributed contextual analytics framework comprising local analytics functions deployed at respective ones of the local nodes and a central analytics function deployed at the central node;
the distributed contextual analysis framework being configured to generate one or more contextual analytics algorithms at the central node and to push the one or more contextual analytics algorithms to the local nodes in order to alter contextual analytics behavior of the local nodes;
wherein the distributed contextual analytics framework further comprises management and orchestration functions deployed at respective ones of at least a subset of the local and central nodes;
wherein a given one of the local nodes comprises a local management and orchestration function that adapts one or more local service functions of the given local node based at least in part on results of local analytics performed by the local analytics function of the given local node;
wherein the local analytics function of the given local node performs local analytics on data captured by a local data capture function of the given local node;
wherein the given local node comprises a local data replication function that replicates at least a portion of the data captured by the local data capture function of the given local node and sends the replicated data to at least one other local node;
wherein the local analytics function of the given local node further comprises a machine learning function that controls generation of one or more triggers that are provided to the local data replication function of the given local node for controlling selective replication of one or more designated portions of the data captured by the local data capture function of the given local node;
wherein the machine learning function is configured to learn one or more constraints relating to replication of data from the given local node to the central node and to control separation of data into replicated and non-replicated portions based at least in part on the one or more learned constraints; and
wherein the processing platform is implemented using at least one processing device comprising a processor coupled to a memory.

2. The apparatus of claim 1 wherein the virtualization infrastructure comprises network functions virtualization infrastructure and the resources of the virtualization infrastructure utilized to implement one or more of the distributed nodes comprise one or more virtual network functions of the network functions virtualization infrastructure.

3. The apparatus of claim 2 wherein a network functions virtualization management entity of the network functions virtualization infrastructure is configured to proactively monitor at least a subset of the distributed nodes and to adjust resources allocated to those proactively monitored ones of the distributed nodes in order to satisfy one or more policies.

4. The apparatus of claim 1 wherein the distributed contextual analytics framework comprises data capture functions deployed at respective ones of at least a subset of the local and central nodes.

5. The apparatus of claim 1 wherein results of the local analytics performed by the local analytics function of the given local node are sent to the central node for further processing by the central analytics function.

6. The apparatus of claim 1 wherein the distributed contextual analytics framework comprises data replication functions deployed at respective ones of a plurality of nodes including the central node and at least a subset of the local nodes.

7. The apparatus of claim 1 wherein the local data replication function of the given local node sends the replicated data to the central node.

8. The apparatus of claim 1 wherein the central node implements a central data repository comprising replicated data received from local data repositories of respective ones of at least a subset of the local nodes.

9. The apparatus of claim 1 wherein the central node comprises a central management and orchestration function that adapts one or more local service functions of respective ones of at least a subset of the local nodes based at least in part on results of local analytics performed by respective local analytics functions of those local nodes.

10. The apparatus of claim 1 wherein at least a subset of the distributed nodes are dynamically added to and deleted from said at least one network in accordance with one or more policies.

11. The apparatus of claim 1 wherein at least a subset of the local nodes comprise respective edge nodes of said at least one network and the central node comprises a core node of said at least one network.

12. An information processing system comprising the apparatus of claim 1.

13. A method comprising:
providing virtualization infrastructure; and
implementing a plurality of distributed nodes at least in part utilizing resources of the virtualization infrastructure;
the distributed nodes comprising a plurality of local nodes and at least one central node interconnected in one or more networks;
wherein the distributed nodes collectively provide at least a portion of a distributed contextual analytics framework comprising local analytics functions deployed at respective ones of the local nodes and a central analytics function deployed at the central node;
wherein the distributed contextual analysis framework is configured to generate one or more contextual analytics algorithms at the central node and to push the one or more contextual analytics algorithms to the local nodes in order to alter contextual analytics behavior of the local nodes;
wherein the distributed contextual analytics framework further comprises management and orchestration functions deployed at respective ones of at least a subset of the local and central nodes;
wherein a given one of the local nodes comprises a local management and orchestration function that adapts one or more local service functions of the given local node based at least in part on results of local analytics performed by the local analytics function of the given local node;

wherein the local analytics function of the given local node performs local analytics on data captured by a local data capture function of the given local node;

wherein the given local node comprises a local data replication function that replicates at least a portion of the data captured by the local data capture function of the given local node and sends the replicated data to at least one other local node;

wherein the local analytics function of the given local node further comprises a machine learning function that controls generation of one or more triggers that are provided to the local data replication function of the given local node for controlling selective replication of one or more designated portions of the data captured by the local data capture function of the given local node;

wherein the machine learning function is configured to learn one or more constraints relating to replication of data from the given local node to the central node and to control separation of data into replicated and non-replicated portions based at least in part on the one or more learned constraints; and wherein the providing and implementing are performed using at least one processing device comprising a processor coupled to a memory.

14. The method of claim 13 further comprising:
sending results of the local analytics performed by the local analytics function of the given local node from the given local node to the central node for further processing by the central analytics function.

15. The method of claim 13 further comprising:
sending the replicated data from the given local node to the central node.

16. The method of claim 13 further comprising:
providing in the central node a central management and orchestration function; and
utilizing the central management and orchestration function to adapt the one or more local service functions of the given local node based at least in part on results of local analytics performed by the local analytics function of the given local node.

17. An article of manufacture comprising a processor-readable storage medium having stored therein program code of one or more software programs, wherein the program code when executed by at least one processing device causes said processing device:
to provide virtualization infrastructure; and
to implement a plurality of distributed nodes at least in part utilizing resources of the virtualization infrastructure;
the distributed nodes comprising a plurality of local nodes and at least one central node interconnected in one or more networks;
wherein the distributed nodes collectively provide at least a portion of a distributed contextual analytics framework comprising local analytics functions deployed at respective ones of the local nodes and a central analytics function deployed at the central node;

wherein the distributed contextual analysis framework is configured to generate one or more contextual analytics algorithms at the central node and to push the one or more contextual analytics algorithms to the local nodes in order to alter contextual analytics behavior of the local nodes;

wherein the distributed contextual analytics framework further comprises management and orchestration functions deployed at respective ones of at least a subset of the local and central nodes;

wherein a given one of the local nodes comprises a local management and orchestration function that adapts one or more local service functions of the given local node based at least in part on results of local analytics performed by the local analytics function of the given local node;

wherein the local analytics function of the given local node performs local analytics on data captured by a local data capture function of the given local node;

wherein the given local node comprises a local data replication function that replicates at least a portion of the data captured by the local data capture function of the given local node and sends the replicated data to at least one other local node;

wherein the local analytics function of the given local node further comprises a machine learning function that controls generation of one or more triggers that are provided to the local data replication function of the given local node for controlling selective replication of one or more designated portions of the data captured by the local data capture function of the given local node; and wherein the machine learning function is configured to learn one or more constraints relating to replication of data from the given local node to the central node and to control separation of data into replicated and non-replicated portions based at least in part on the one or more learned constraints.

18. The article of manufacture of claim 17 wherein the distributed contextual analytics framework comprises data capture functions deployed at respective ones of a plurality of nodes including the central node and at least a subset of the local nodes.

19. The article of manufacture of claim 18 wherein results of the local analytics performed by the local analytics function of the given local node are sent to the central node for further processing by the central analytics function.

20. The article of manufacture of claim 17 wherein the distributed contextual analytics framework comprises data replication functions deployed at respective ones of a plurality of nodes including the central node and at least a subset of the local nodes.

* * * * *